Feb. 19, 1929.

H. L. ROTHROCK 1,702,272

SANDING DEVICE

Filed Aug. 25, 1927

Witness:
Chas. R. Koursh.

Inventor,
H. L. Rothrock
Attys.

Feb. 19, 1929.  1,702,272
H. L. ROTHROCK
SANDING DEVICE
Filed Aug. 25, 1927   2 Sheets-Sheet 2

Witness:
Inventor
H. L. Rothrock

Patented Feb. 19, 1929.

1,702,272

UNITED STATES PATENT OFFICE.

HENRY L. ROTHROCK, OF CHICAGO, ILLINOIS.

SANDING DEVICE.

Application filed August 25, 1927. Serial No. 215,288.

This invention relates to improvements in sanding devices, and more particularly to sanding devices for use with automobiles to prevent skidding thereof, and has for its principal object to provide an improved construction and arrangement of valve and valve operating devices whereby the same is rendered positive in operation and may be readily assembled or taken apart for inspection or repair.

The invention may best be understood by reference to the accompanying drawings, in which Figure 1 is a side view of an automobile equipped with a device constructed in accordance with my invention.

Figure 1:
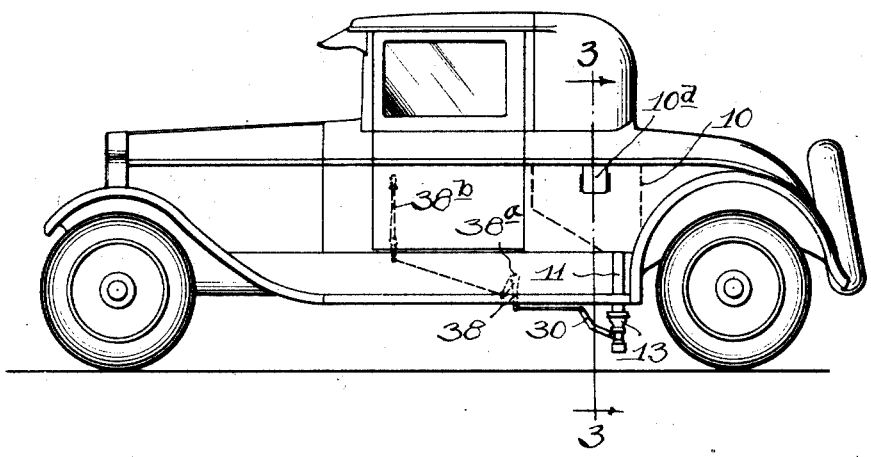
Figure 2:
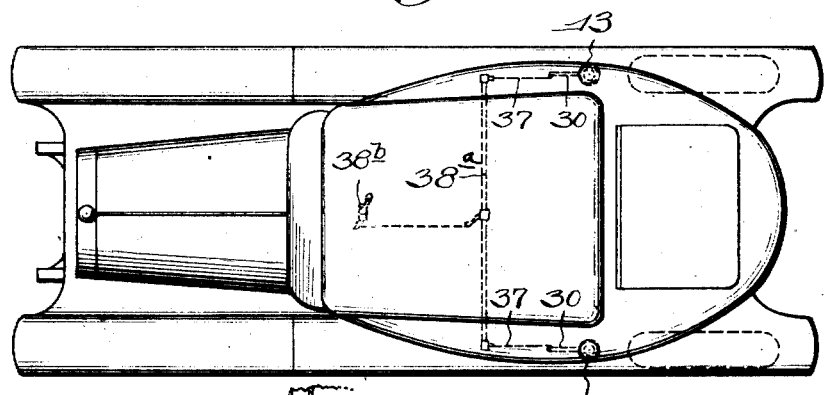
Figure 2 is a plan view of the automobile shown in Figure 1.
Figure 3:
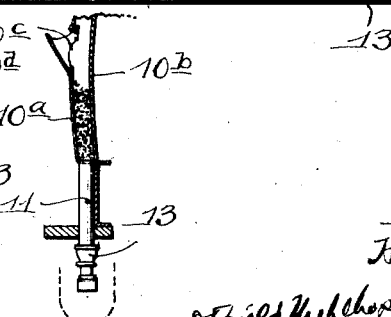
Figure 3 is a detail section taken on line 3—3 of Figure 1.
Figures 4, 5, 6:
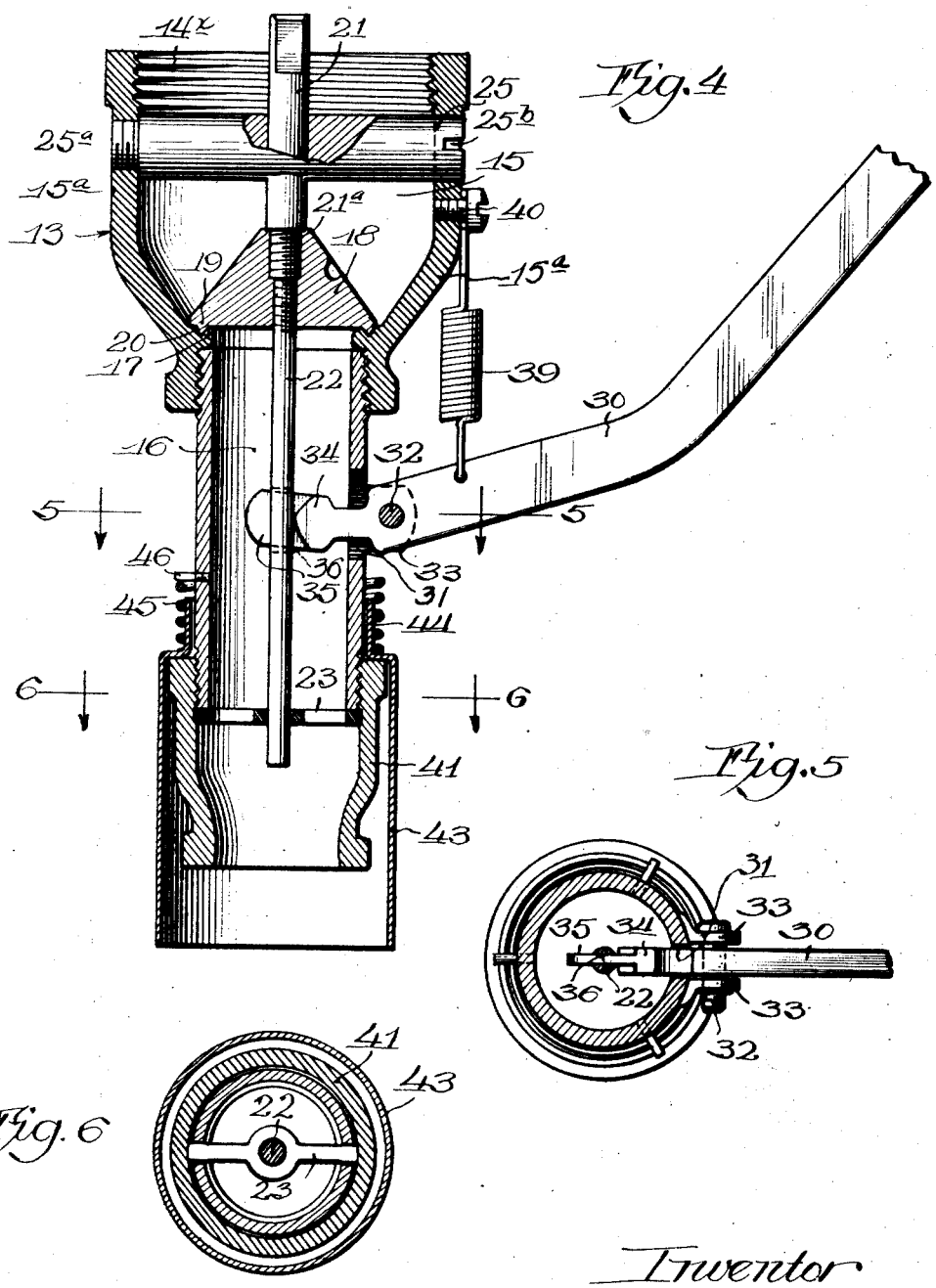
Figure 4 is an enlarged vertical section of the valve forming a part of my invention.
Figure 5 is a section taken on line 5—5 of Figure 4.
Figure 6 is a section taken on line 6—6 of Figure 4.

Referring now to details of the embodiment of my invention shown in the drawings, I provide a suitable reservoir 10 for sand or similar pulverized material, and a delivery pipe 11 including a valve, said pipe being arranged to discharge the sand or like immediately in front of the rear wheels of an automobile. For this purpose, two reservoirs with their delivery fittings are provided, one at each side of the automobile and preferably formed as a part of the automobile body as shown. The two reservoirs and delivery fittings being similar, a description of one will suffice for an understanding of both.

The reservoir 10 may be formed between the inner and outer walls 10$^a$, 10$^b$ of the automobile body, and preferably having its lower walls sloping downwardly toward the outlet pipe 11 at the bottom thereof, as shown. The reservoir may be filled through an opening 10$^c$ covered by a downwardly opening hinged closure 10$^d$. A delivery and valve fitting 13 is connected to the lower end of pipe 11, as for instance, by threading the same, as shown herein the enlarged upper end opening 14$^x$ of the delivery fitting 13 having internally threaded engagement with the pipe 11. The delivery fitting 13 is provided with a relatively large upper chamber 15 and a smaller lower chamber 16 with a valve seat 17 forming a partition between the two chambers. A cooperating valve member 18 is adapted to rest upon the valve seat, in the preferred form shown said valve member being substantially dome-like in shape and having its lower face provided with a ring-shaped bead 19 substantially V-shape in cross section, which engages in a cooperating groove 20 formed in the valve seat 17. I find that this type of valve is especially efficacious in controlling the flow of sand in a device of this character.

Guide means for the valve member 18 comprises an upper guide stem 21 and a lower stem 22, respectively secured to and extending coaxially above and below the valve member 18. The lower guide stem 22 has bearing in a transverse supporting member 23 which in the form shown may be fixed to extend across the lower chamber 16. The upper guide stem 21 is preferably detachably connectible to the valve member 18, as for instance by screw threads 21$^a$, and extends upwardly through a cross member 25 which is detachably supported across the upper chamber 15. In the form shown, the upper cross member 25 is threaded at one end 25$^a$ in the side wall 15$^a$ of the upper chamber immediately below the threaded opening 14$^x$ thereof, while the opposite end of said cross member extends through the opposite wall and is provided with a slot 25$^b$ or similar tool engageable means so as to permit said cross member to be unscrewed and removed endwise from its normal position.

The arrangement is such that the upper guide stem 21 may be first unscrewed from the valve 18 and removed upwardly through the cross member 25. Thereafter, the cross member 25 may be removed endwise and the valve together with its lower guide stem 22 may be entirely removed from the upper end of the chamber 15.

Means for operating the valve include a lever 30 extending through a slot 31 formed in the side wall of the lower chamber 16 and pivoted on pin 32 between a pair of lugs 33, 33 projecting from said wall. The inner end of the lever 34 is suitably connected with the lower guide stem 22, as for instance by inserting a rounded end portion 35 in a vertical slot 36 formed in the lower guide stem 22. Any suitable means for operating the lever may be provided, as for instance rods 37, 37 connected by levers 38, 38, on a common operating rod 38$^a$ controlled by handle 38$^b$ at a convenient position adjacent the operator's seat.

A spring 39 is connected between the lever 30 and a support 40 attached to the side of the upper end wall 15ª of the delivery fitting, which spring tends normally to maintain the valve in closed position.

The fitting above described is preferably mounted and supported with a delivery tube 41 forming an extension of the lower chamber 16 immediately in front of its respective wheel. In order to protect the delivery tube from the splashing of water and mud usually caused on the road, I provide a suitable protecting apron spaced outwardly and projecting slightly below the end of the delivery tube 41. In the form shown, this apron consists of an annular guard member 43 extending around all sides of the discharge tube 41 and having its upper end supported on the outer wall of the lower chamber 16. In the form shown, this support is preferably arranged to provide limited vertical movement of the protecting apron 43 when the same is accidentally struck by obstructions. For this purpose, the upper end of said apron is provided with an annular sleeve 44 which has vertical movement along the walls of the lower chamber 16 and is normally maintained in lowered position by a coiled spring 45 interposed between the upper end of the apron 43 and a stop 46 disposed below the operating lever 34.

I claim as my invention:

1. In a device of the character described, a discharge fitting having upper and lower chambers separated by a valve seat, a valve member adapted to rest on said seat and having guide stems above and below the same, a transverse supporting member for the upper guide stem removably mounted in said upper chamber, and operating means for said valve including a lever having detachable slotted connection in the lower guide stem whereby said valve member may be removed upwardly.

2. In a device of the character described, a discharge fitting having upper and lower chambers separated by a valve seat, a valve member adapted to rest on said seat and having guide stems above and below the same, said upper stem having threaded connection with said valve member, and a transversely removable supporting member for said upper guide stem having threaded connection in said fitting, whereby said valve member can be removed upwardly.

Signed at Chicago, Ill., this 23rd day of August, 1927.

HENRY L. ROTHROCK.